(12) United States Patent
Zhang et al.

(10) Patent No.: US 8,752,130 B2
(45) Date of Patent: Jun. 10, 2014

(54) TRUSTED MULTI-STAKEHOLDER ENVIRONMENT

(75) Inventors: Xinwen Zhang, Milpitas, CA (US); Jean-Pierre Seifert, Tirol (AT); Wookhee Min, Seoul (KR); Onur Aciicmez, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1657 days.

(21) Appl. No.: 11/963,363

(22) Filed: Dec. 21, 2007

(65) Prior Publication Data

US 2009/0165081 A1 Jun. 25, 2009

(51) Int. Cl.
*G06F 7/04* (2006.01)

(52) U.S. Cl.
USPC .................................................. 726/3

(58) Field of Classification Search
USPC .................................................. 726/3
See application file for complete search history.

(56) References Cited

U.S. PATENT DOCUMENTS

| 7,162,743 B1 * | 1/2007 | Bolding et al. | 726/27 |
|---|---|---|---|
| 7,774,599 B2 * | 8/2010 | Guo et al. | 713/164 |
| 8,005,737 B2 * | 8/2011 | Hammad | 705/35 |
| 2005/0120219 A1 * | 6/2005 | Munetoh et al. | 713/176 |
| 2005/0213763 A1 * | 9/2005 | Owen et al. | 380/270 |
| 2006/0090193 A1 * | 4/2006 | Johnson et al. | 726/1 |
| 2008/0109662 A1 * | 5/2008 | Natarajan et al. | 713/193 |
| 2009/0075696 A1 * | 3/2009 | Kanapur et al. | 455/557 |

OTHER PUBLICATIONS

"On the Deployment of Mobile Trusted Modules", Andreas U. Schmidt et al., Fraunhofer Institute for Secure Information Technology SIT, Dec. 13, 2007, 6 pages.
"TCG Mobile Reference Architecture", Specification version 1.0, Revision 1, Jun. 12, 2007, 12 pages.

* cited by examiner

*Primary Examiner* — Krista Zele
*Assistant Examiner* — Esther Benoit
(74) *Attorney, Agent, or Firm* — Kenneth L. Sherman, Esq.; Michael Zarrabian, Esq.; Sherman & Zarrabian LLP

(57) ABSTRACT

In one embodiment, a multi-stakeholder environment is controlled by first assigning a first domain to a first stakeholder and a second domain to a second stakeholder. Then a first access policy is defined for the first domain and access is restricted to the first domain for the second stakeholder according to the first access policy. In another embodiment, an access request is handled in a multi-stakeholder environment by first receiving parameters forwarded by hooks in system call functions in a kernel of the multi-stakeholder environment, wherein the parameters contain information about a first stakeholder requesting access to a domain corresponding to a second stakeholder. Then it is determined whether to allow the first stakeholder to access the domain based at least partially upon security settings corresponding to the domain.

11 Claims, 7 Drawing Sheets

TRUSTED MULTI-STAKEHOLDER ENVIRONMENT

BACKGROUND OF THE INVENTION

1. Field of the Invention

The present invention relates to computer security. More specifically, the present invention relates to the building of trusted mobile platforms.

2. Description of the Related Art

Mobile devices such as mobile phones or personal data assistants often store sensitive data that could be damaging if it fell into the wrong hands. These data can come from the applications from multiple stakeholders, such as the manufacturer, network provider, and third party service providers. Additionally, the user of a mobile device can store personal data and download/install software from the Internet or from other potentially unreliable sources. Furthermore, malicious programs do not always require active installation by a user in order to gain access to sensitive information. For example, a malicious program may automatically (and surreptitiously) install itself on the mobile device upon download. Malicious programs can utilize this sensitive information for many different types of untoward behavior. For example, a recent mobile phone virus was found that can send out user address book or calling history to others without the user's permission.

SUMMARY OF THE INVENTION

In one embodiment, a multi-stakeholder environment is controlled by first assigning a first domain to a first stakeholder and a second domain to a second stakeholder. Then a first access policy is defined for the first domain and access is restricted to the first domain for the second stakeholder according to the first access policy. In another embodiment, an access request is handled in a multi-stakeholder environment by first receiving parameters forwarded by hooks in system call functions in a kernel of the multi-stakeholder environment, wherein the parameters contain information about a first stakeholder requesting access to a domain corresponding to a second stakeholder. Then it is determined whether to allow the first stakeholder to access the domain based at least partially upon security settings corresponding to the domain.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In an embodiment of the present invention, the isolation and protection of individual stakeholder resources is provided, wherein each stakeholder is represented as a "domain" on a mobile device. For purposes of this document, the term "stakeholder" shall be defined as an entity controlling application(s) and data that are not to be shared with other stakeholders. This isolation prevents one stakeholder from accessing resources controlled by another stakeholder. Thus, each stakeholder has exclusive control over the data in their own engine. Through this protection, the risk of malicious software or users gaining access to sensitive data is significantly reduced.

Figure 1:
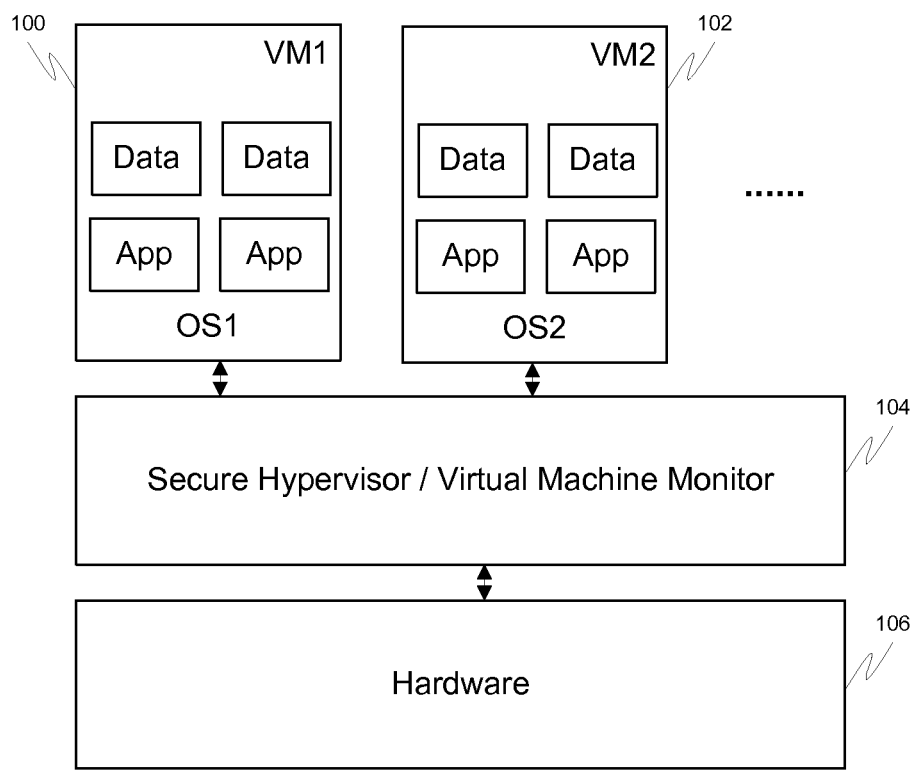
FIG. 1 depicts an architecture of a virtualization-based solution.

Typical stakeholders include device manufacturers, communication carriers, service providers, and the user. An architecture overview is specified in FIG. 1. Users typically store their data using multiple virtual machines 100, 102. These users may include individual users, service providers, communication carriers, device manufacturers, etc. Service providers provide some service consumed in the platform. There may be multiple service provider stakeholders in a platform. Examples of services include corporate services for employees, content distribution services for consumers, address books, and diaries. Communication carriers are special service providers providing cellular radio access for the platform. There may be multiple communication carrier stakeholders in a platform. Finally, the device manufacturer may provide internal communications within a platform and typically provides all the hardware resources within a platform.

The Trusted Computing Group (TCG) Mobile Phone Working Group (MPWG) has defined a specification for a trusted mobile reference architecture, but this specification does not properly address the need for isolation between stakeholders.

In one solution, a virtualization-based approach is proposed. Specifically, the resources and applications of a domain/stakeholder may be located in a dedicated virtual machine (VM) 100, 102 with its own operating system (OS) and application runtime environment such that individual domains are isolated by a virtual machine monitor (VMM) or hypervisor 104. This communication between the domains is controlled by the VMM 104 according to predefined policies. Thus, the VMM 104 acts to prevent unauthorized access by one stakeholder of the resources and/or data controlled by another stakeholder.

The main disadvantage of this approach is the performance. Typically, virtualization is accomplished via a software layer that abstracts the underlying hardware resources (e.g., CPU cycles, memory, and storage). This software layer introduces significant overhead to the device. As mobile devices are typically very resource-constrained with limited computing capability and restricted power consumption, virtualization is not a practical solution. Thus, an alternative solution is proposed.

In a solution in accordance with an embodiment of the present invention, the export of services to the device is enabled in a secure and controlled manner via each of the domain engines. Each engine can enforce policies that restrict the uses of the engine's resources by its owner and others on the device, and the interactions between different engines. An engine's policies are defined by its stakeholder. A stakeholder can be represented by a domain on the mobile platform. It should be noted that each stakeholder can have multiple engines on a single device. Each engine may be isolated from another through use of various techniques that will be described later.

Figure 2:
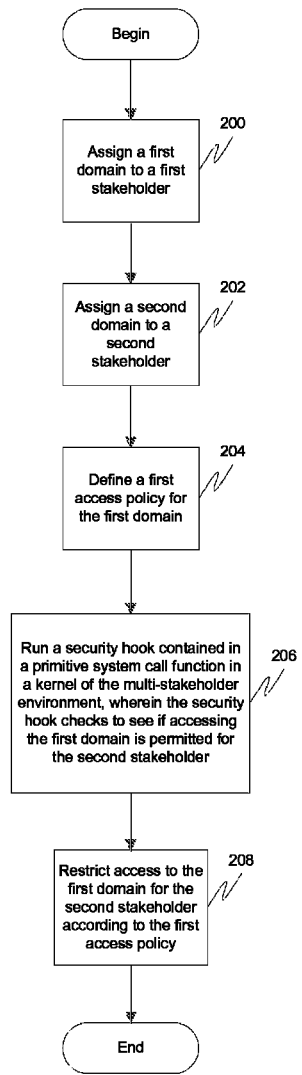
FIG. 2 illustrates a method for controlling a multi-stakeholder environment in accordance with an embodiment of the present invention.

FIG. 2 is a flow diagram illustrating a method for controlling a multi-stakeholder environment in accordance with an embodiment of the present invention. Each of the steps of this method may be performed by hardware, software, or any combination thereof. In one embodiment, the multi-stakeholder environment is a mobile phone environment, however embodiments are foreseen where the multi-stakeholder environment is another type of mobile environment. At 200, a first domain may be assigned to a first stakeholder. This assignment may take many forms. For example, a mapping may be created between the first domain and the first stakeholder. Various state variables may be created and monitored for the first stakeholder and these variables may be accessible by a centralized system and by an engine corresponding to the first domain. At 202, a second domain may be assigned to a second stakeholder. This assignment may also take many forms. For example, a mapping may be created between the second domain and the second stakeholder. Various state variables may be created and monitored for the second stakeholder and these variables may be accessible by a centralized system and by an engine corresponding to the second domain. At 204, a first access policy may be defined for the first domain. This access policy may act to limit access to the first domain to certain trusted domains. Embodiments are possible where the access policy does not allow users or resources corresponding to any other domain to access resources of the first domain. However, embodiments are also possible wherein certain individuals, such as administrators, are granted access.

The access policy itself may take many forms and may vary in granularity. For example, the access policy may be something as simple as "no individuals or resources associated with other domains may access resources of the first domain." Fine granularity embodiments are also anticipated wherein individual resources or traffic types have different security policies.

At 206, a security hook contained in a primitive system call function in a kernel of the multi-stakeholder environment may be run, wherein the security hook checks to see if accessing the first domain is permitted for the second stakeholder. This may be accomplished by accessing a security module having a set of defined policies, including the access policy set up in step 204. At 208, access to the first domain may be restricted for the second stakeholder according to the first access policy.

Figure 3:
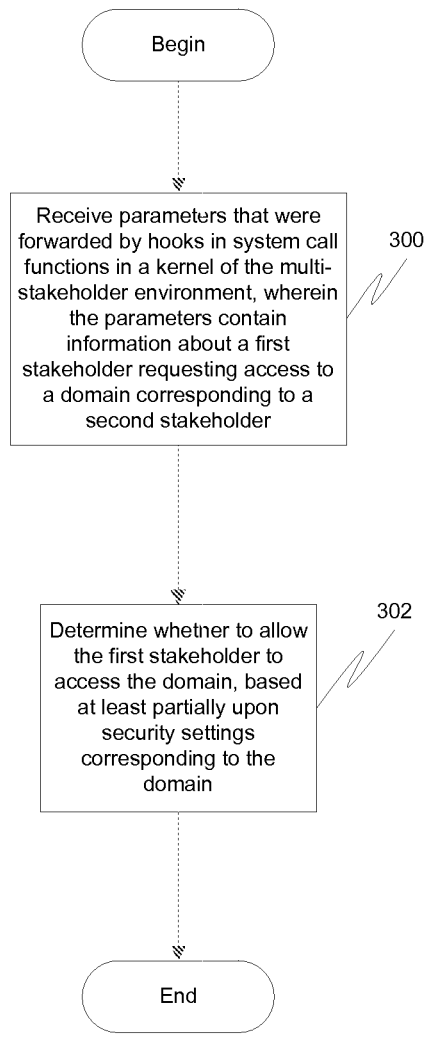
FIG. 3 illustrates a method for handling an access request in a multi-stakeholder environment in accordance with an embodiment of the present invention.

FIG. 3 is a flow diagram illustrating a method for handling an access request in a multi-stakeholder environment in accordance with an embodiment of the present invention. Each of the steps of this method may be performed by hardware, software, or any combination thereof. In one embodiment, the multi-stakeholder environment is a mobile phone environment. At 300, parameters are received that were forwarded by hooks in system call functions in a kernel of the multi-stakeholder environment, wherein the parameters contain information about a first stakeholder requesting access to a domain corresponding to a second stakeholder. These parameters may have been passed upon a triggering event that caused the hooks in the system call functions to execute. Such actions include, but are not limited to, actions involving access of resources of the domain corresponding to a second stakeholder. It should be noted that while the present embodiment describes the parameters as including information about a first stakeholder requesting access to a domain corresponding to a second stakeholder, there are instances where the parameters might indicate information about a first stakeholder requesting access to his own domain. At 302, it is determined whether to allow the first stakeholder to access the domain, based at least partially upon security settings corresponding to the domain. The security settings may include a set of defined policies. The access policies themselves may take many forms and may vary in granularity. For example, an access policy may be something as simple as "no individuals or resources associated with other domains may access resources of the first domain." Fine granularity embodiments are also anticipated wherein individual resources or traffic types have different security policies.

In one example embodiment, SELinux may be used to enforce mandatory access control policies on the Linux kernel level to isolate and protect system resources between different domains (or engines). It should be noted that while a detailed embodiment describing an SELinux implementation will now be described, nothing in this document shall be construed to mean that the invention is limited to an SELinux implementation. Rather, embodiments utilizing many different protocols and standards are foreseen.

SELinux implements strong mandatory access control (MAC) using Linux Security modules (LSM) inside the Linux kernel based upon the principle of least privilege. SELinux associates attributes of the form user:role:type to all subjects (processes) and objects (files, sockets, etc.), which are called the "security context." Within the security context, the type attribute represents the type of the subject or object, e.g., http_t and user_home_t. The identification of subjects, objects and their access enforcement by means of types is formally known as Type Enforcement (TE). Instead of directly associating a user with a type, SELinux associates a user with a role and a role with a set of types. The role merely simplifies the management of users. Therefore, access control in SELinux is primarily enforced via TE.

A typical policy rule in SELinux might be to allow a type of subjects to have some permissions on some other types of objects. These permissions may be defined according to object classes, e.g., read, write, append, lock for a file related objects and tcp_send, tcp_recv for network interface objects. These rules may be checked by security hook functions predefined in the Linux kernel.

Figure 4:
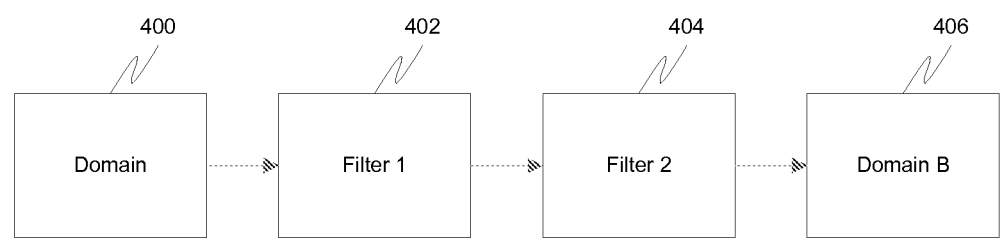
FIG. 4 illustrates an example of SELinux acting to control a subject's activities with a least-privilege principle, and confine the information flow between domains, in accordance with an embodiment of the present invention.

SELinux may act to control a subject's activities with a least-privilege principle, and confine the information flow between domains. FIG. 4 illustrates an example of this. Here, domain A 400 and domain B 402 are shown. Their communication occurs through filters 404 and 406. In this case, SELinux types and policy rules can be defined to ensure all of the following:

1. Information flow can only be allowed from Domain A 400 to Domain B 402 and not vice-versa.

2. The information has to be checked by Filter 1 404 (e.g., virus check) followed by Filter 2 406 (e.g., spam check) before it goes to domain B 402—i.e., the filters are not bypassable.

3. Filter 1 404 and Filter 2 406 are the only entities that can read the information from Domain A 400 to Domain B 402.

4. Filter 1 404 and Filter 2 406 can only access the information from Domain A 400 to Domain B 402 and nothing else in the system.

Through these policy rules, if Filter 1 404 and Filter 2 406 are trusted to perform their correct job, any information from Domain A 400 to Domain B 402 can be correctly controlled. As an example, assume that Domain A 400 has a lower integrity level than Domain B 402. If Filter 1 404 and Filter 2 406 are trusted to validate the format the content of data, then the input (data or service) from Domain A 400 to Domain B 402 can be sanitized and thus cannot compromise the integrity of Domain B 402.

Least-privilege security administration may also be used to preserve strong isolation and controlled communication between domains. For example, in the above example, no security administrative permissions of Domain B 402 can be assigned to any administrative roles in Domain A 400, otherwise the policy rules can be maliciously modified. This prevents, for example, another uncontrolled channel from being created between A 400 and B 402, or bypassing the filters. As such, this acts to plug any additional security leaks that may occur.

SELinux also has the ability to provide fine-grained access control. Because of this, an SELinux policy may comprise a large number of types and policy rules.

Figure 5:
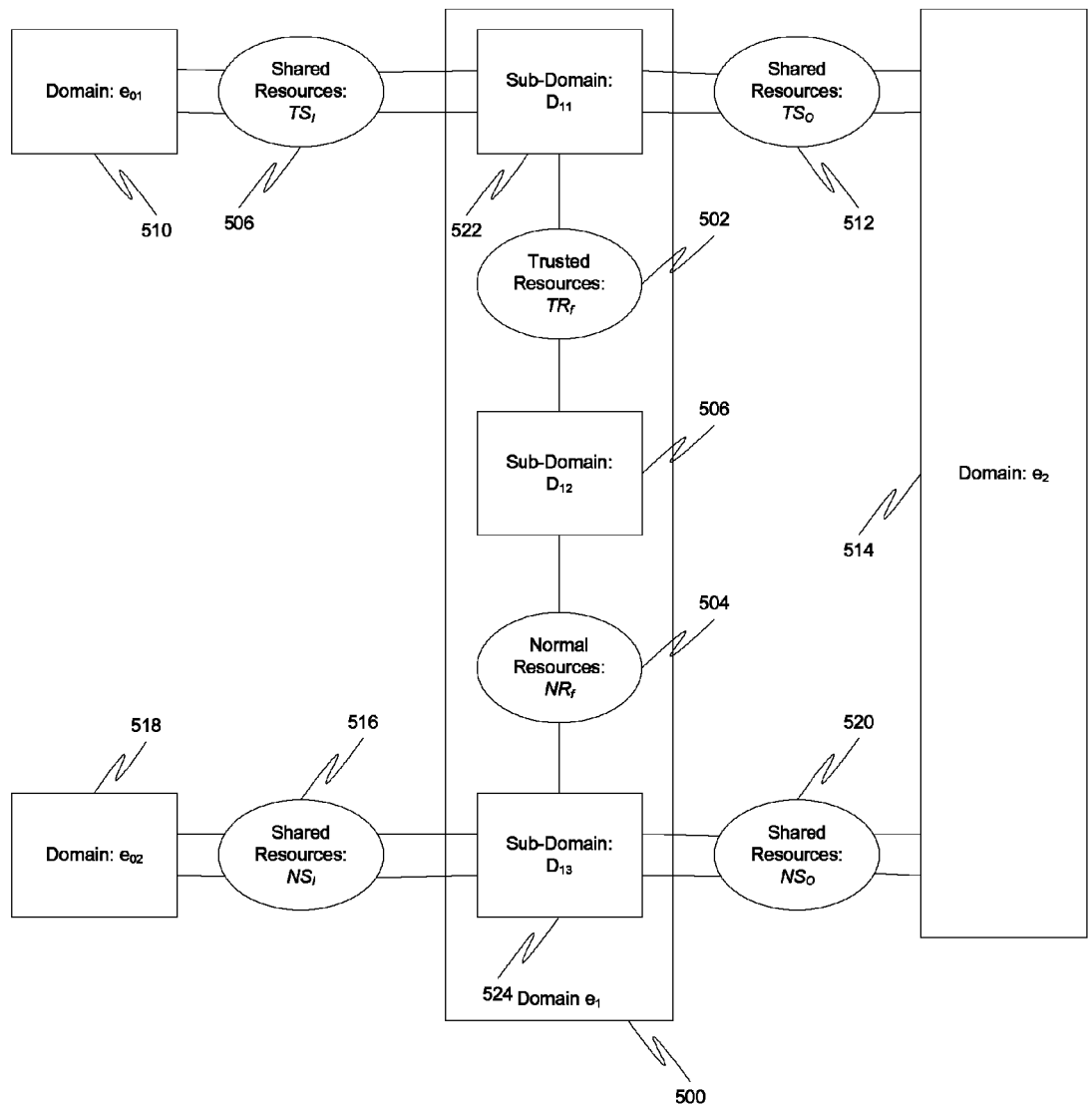
FIG. 5 illustrates an example of a security policy, in accordance with an embodiment of the present invention.

SELinux may be used to provide isolation between engines such that an engine cannot directly access the resources of another engine—they can only communicate through dedicated and non-bypassable interfaces. An engine may have private trusted resources and normal resources, and can receive inputs from and provide outputs to other engines. In order to preserve strong isolations, two engines can only communicate through shared resources (i.e., interfaces). FIG. 5 is a diagram illustrating an example of the security policy. In this policy, a generic engine $e_1$ is represented as a domain 500, which has its private trusted resources ($TR_1$ 502) and normal resources ($NR_1$ 504). Internal trusted services can be accessed by the normal services, which is indicated by the sub-domain $D_{12}$ 506 of $e_1$ 500. Typical functions provided by trusted services to normal services include integrity measurement, secure storage, and monotonic counters. In an embodiment of the present invention, the information flow between these services is one-way.

Each engine may consume services provided by other engines and provide services to others. Both can have trusted resources and/or normal resources. These communications are represented by shared resources between $e_1$ and other engine domains. Specifically, domain $e_1$ 500 can get trusted resources $TS_1$ 508 from domain $e_{o1}$ 510 and provide other trusted resources $TS_0$ 512 to domain $e_2$ 514. Similarly, $e_1$ 500 can consume normal resources $NS_1$ 516 from domain $e_{o2}$ 518 and provide normal resources $NS_0$ 520 to domain $e_2$ 514. The one-way information flow indicates usage scenarios of communication between engines in accordance with an embodiment of the present invention. For example, an engine of a network carrier may provide cellular service to an engine of a third party service provider, and it does not consume any service from this engine. In more general scenarios, two-way information flow may be allowed if appropriate interfaces are defined.

A domain in the policy model of SELinux can be decomposed. In this approach, a generic engine $e_1$ can be represented as a domain, and it is decomposed into three sub-domains: the trusted domain $D_{11}$ 522, the normal domain $D_{13}$ 524, and the domain entrypoints $D_{12}$ 506. At the same time, $D_{11}$ 522 and $D_{13}$ 524 act as the entities to communicate with external engines on trusted and normal services, respectively. Therefore, it is natural that each of these sub-domains can be further decomposed into a few sub-domains, each of which handles different communications between other internal and external domains. Note that domain $e_{o1}$ 510 and $e_{o2}$ 518 can belong to two distinct engines as well as the same engine. In the most general scenario, an engine can consume services from and provide services to the same or different engines. The actual details of possible domains and sub-domains and also the interactions between them depend on the exact implementations of the available engines on a platform and the service level agreements between different engines.

In traditional PC and server systems, a single system security administrator or the root has the ultimate control of the platform, and external entities have to trust the administrator and the policies deployed. On a mobile platform, the problem is different since it naturally is a multi-stakeholder environment.

Loadable policy modules supported by SELinux offer a flexible way to create self-contained policy modules that are linked to the existing policy without recompiling the entire policy source each time. A policy module can define private types and attributes and then define interfaces so that other modules can use them, thus enabling communication between the subjects whose types are defined in different modules. After a module is created, it can be loaded to the kernel during runtime using SELinux policy management infrastructure. Thus, capabilities to change and load policy modules can be defined and assigned to different administrative roles of different domains. Additionally, each domain has its own policy module where its internal resources can be defined with private types and only shared resources can be accessed through module interfaces by other policy writers (e.g., the administrative roles of other engines). This provides modularity and encapsulation for policy development and management, and self-protection for the security system.

Figure 6:
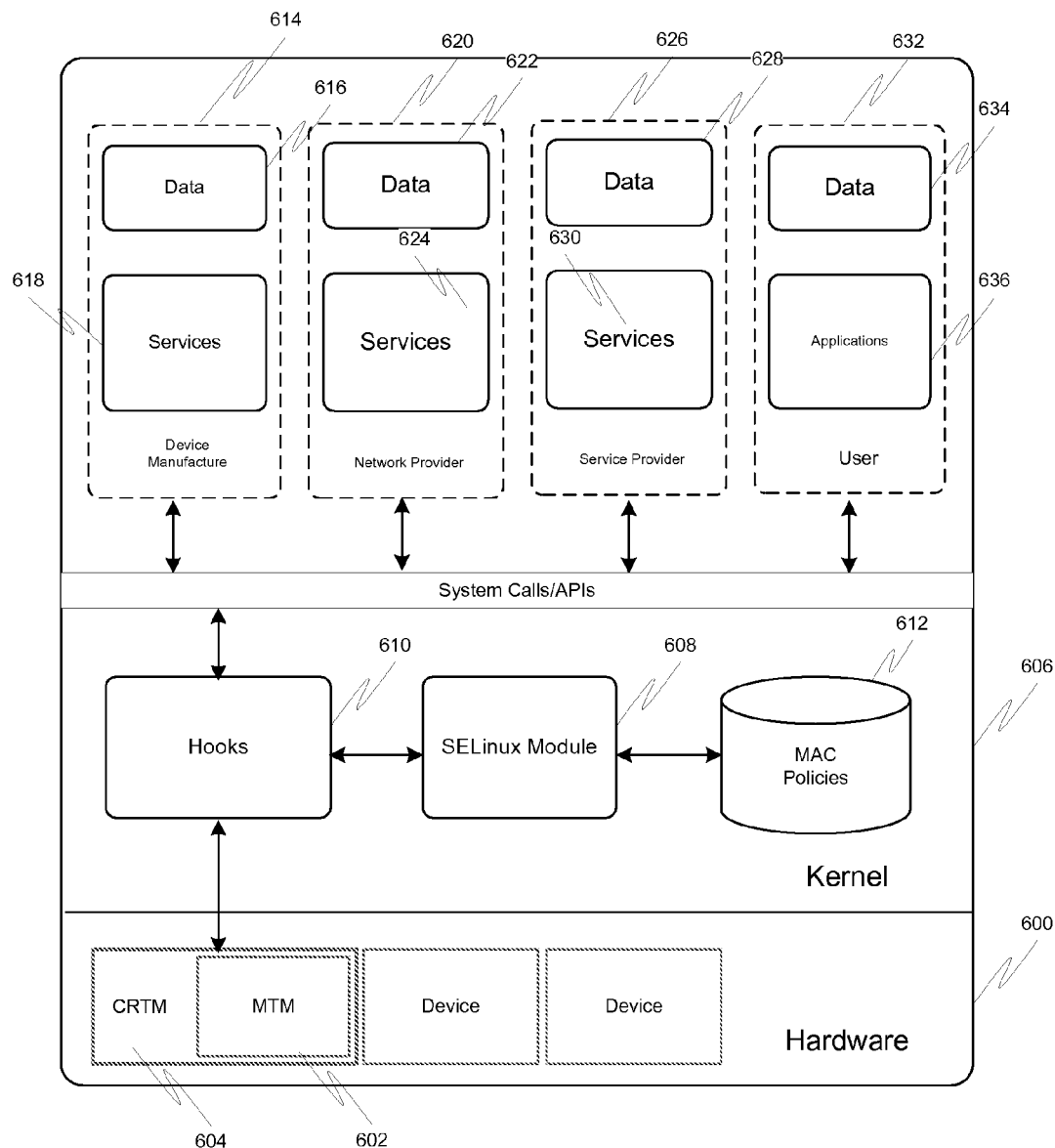
FIG. 6 depicts a platform architecture using SELinux in accordance with an embodiment of the present invention.

FIG. 6 is a diagram illustrating a platform architecture using SELinux in accordance with an embodiment of the present invention. A hardware layer 600 includes a Mobile Trusted module (MTM) 602 and a Core Root of Trust Measurement 604. The MTM 602 and CRTM 604 provide the hardware-based root of trust. Root of trust refers to the components that are inherently trusted by the system, and as such the components within the Core Root of Trust Measurement 604 need not (or cannot) be measured and/or verified. The term MTM actually refers to two types of modules: a Mobile Remote-Owner Trusted Module (MRTM) and a Mobile Local-Owner Trusted Module (MLTM). The difference between the two types of modules lies in the types of commands they support, and the details of these are beyond the scope of this application.

During booting, the booting components of the platform, including the BIOS, boot loader, and OS kernel, may be measured and their integrity values are stored in particular platform configuration registers (PCRs) of the MTM. The integrity of the kernel 606 includes the SELinux module 608 and hook functions 610. After the kernel boots, the integrity of each SELinux policy stored in 612 may be measured by the kernel 606. These measured values can be sent to a remote stakeholder for attestation purposes to verify the integrity of the runtime environment on the platform. Here, four different remote stakeholders are shown. A device manufacturer 614 controls data 616 and services 618. A network provider 620 controls data 622 and services 624. A service provider 626 controls data 628 and services 630. A user 632 controls data 634 and user applications 636.

Policies may be defined by individual domain stakeholders 614, 620, 626, 632 and loaded to the OS kernel 606. Any access to a domain's resource or service may be completely confined by the corresponding domain policies, thus reducing or eliminating the security threat of malicious software or individuals gaining access to resources controlled by other domains.

Figure 7:
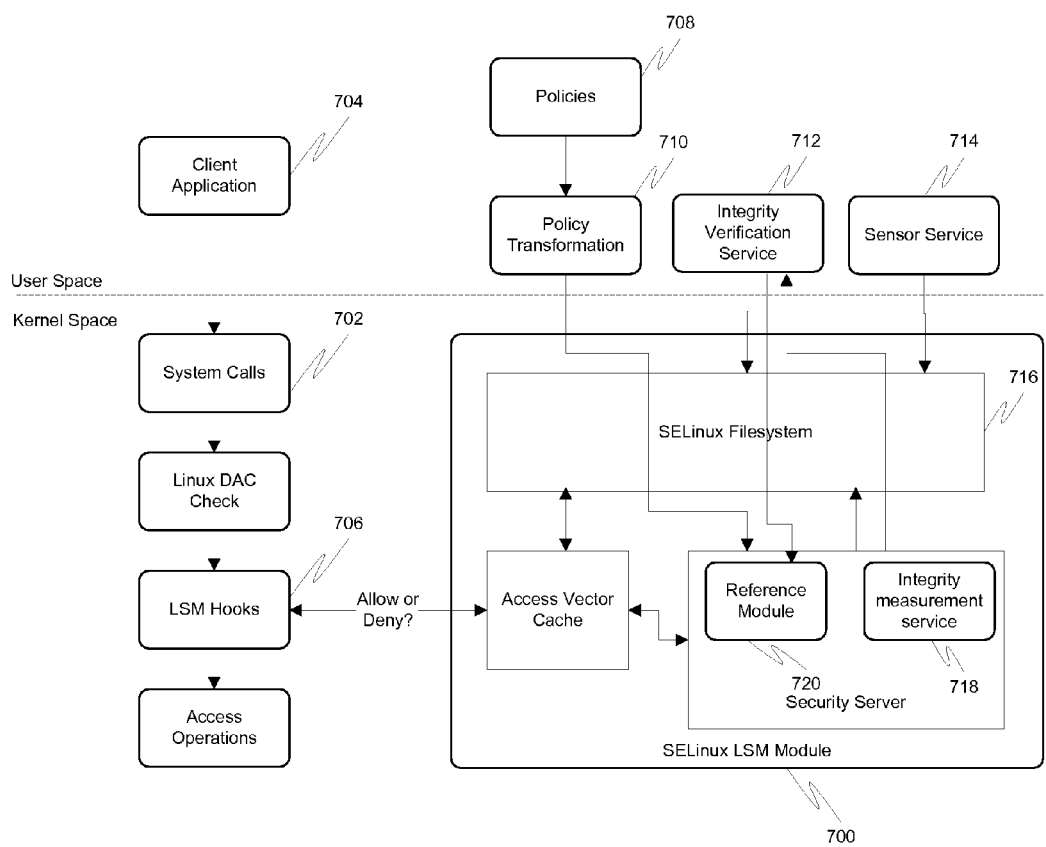
FIG. 7 depicts an SELinux architecture in accordance with an embodiment of the present invention.

FIG. 7 describes an SELinux architecture in accordance with an embodiment of the present invention. This architecture may include a Linux Security Module (LSM) 700, which defines the placement of hook functions that are inserted into the Linux kernel. Whenever a system call function 702 is invoked by a process 704 to access some resources (e.g., read/write a file or open a network connection), the corresponding SELinux LSM hooks are invoked 706. These functions check the SELinux LSM Module, which makes decisions based upon loaded SELinux policies 708. The kernel then enforces the decision to allow or deny the access.

Each resource in SELinux may be labeled with a single type. Similarly, each process may be labeled with a single domain, which may also be referred to as an SELinux "type." An access control decision may be determined by a policy, which includes a set of rules. Typically, an SELinux policy rule indicates that any process of a particular domain has a set of permissions to any resource of a particular type.

For example, the following rule states that any process of domain medical_t (e.g., /medical/exec) can do any operation to any file of type medicalObject_t (e.g., any file in /medical/exec).

```
... ...
/medical/exec -- medical_u : medical_r : medical_t
/medical/db(/.*)? medicalObject_u: medicalObject_r: medicalObject_t;
... ...
type medical_t;
type medicalObject_t;
role medical_r types medical_t;
role medicalObject_r types medicalObject_t;
user medical_u roles {medical_r};
user medicalObject_u roles {medicalObject_r);
allow medical_t medicalObject_t : file *;
```

Without any other rules indicating access to medicalObject_t files, this rule implies that only processes with domain medical_t can access medicalObject_t files, thus preventing any access from processes of other domains.

The domain of a process can be determined by the user who runs the program, or by the location (path) of the program file. Moreover, this can be defined by policy rules. Similarly, rules can be defined to confine the communication between processes from different domains, including executing/killing a process, sending messages to a process, and sharing resources (file, memory, or socket) between processes.

In an embodiment of the present invention, integrity measurement and verification may be integrated into the system. Referring back to FIG. 7, the user space may run a series of services, including policy transformation 710, integrity verification 712, and sensor 714. In the kernel space, an SELinux filesystem may provide interfaces to allow user space services to set values for conditional policies. When a policy 708 is transformed, a set of files may be created in this filesystem 716. The integrity verification service 712 may act to enforce usage control policies using input from an integrity measurement service 718 that measures other runtime components. Measured events and integrity values may be stored in a measurement list and corresponding platform configuration registers in a trusted platform module may be extended accordingly.

The integrity measurement service 718 may perform many different actions in monitoring the integrity of the policies. Specifically, a reference monitor 720 may be measured after the kernel is booted. The client application, object, and configuration may be measured right before the client application is invoked. The integrity of individual policies, the policy transformation service, and the sensor may be measured when they are invoked and just before their execution. MAC policies may be measured when they are loaded such as when the platform boots or if they are loaded at runtime. Additionally, any other applications or services that need to communicate or collaborate with the client application may be measured before they are invoked. This allows the integrity management service 718 to monitor all other applications that interact with the sensitive client applications running on the same platform.

In order to enforce the policies, the integrity verification service 712 may verify corresponding integrity values measured by the integrity measurement service 718 and generate inputs to the reference monitor 720.

As an example, a client application may only be allowed to access a target object when its "current" integrity corresponds to a known value. When a user logs in or attempts to access the object by invoking the client application, the user attributes may be checked by the reference monitor 720 based upon the authentication of the user to the system (e.g., rile and necessary credentials of the user). When the client application is invoked by the user, it may be measured by the integrity measurement service 718 prior to being loaded into memory. During runtime, if the client application generates an access request to the object, the integrity measurement service 718 may measure the current integrity of the client application and pass that information to the integrity verification service 712. The integrity verification service 712 may check the measured value against the known value and if they match, the client application can access the object. If not, then the client application cannot access the object. The decision as to whether the client application can or cannot access the object may then be passed to the reference monitor 720. The sensor service 714 may monitor environmental information of the computing device (e.g., location) and provide these also to the reference monitor for policy evaluation when an access occurs on the platform with regard to the policies. Whenever there is a change of any information specified in the policies, the new information may be reported by the sensor service thus invoking the re-evaluation of the ongoing access.

Where the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for controlling a multi-stakeholder environment in a single electronic device, the method comprising:
assigning a first domain to a first stakeholder, wherein the first domain comprises a first grouping of isolated applications and data, wherein the assigning a first domain includes setting aside system resources for the first grouping of isolated applications and data, wherein the first stakeholder is a manufacturer of the single electronic device, and wherein the first grouping of isolated applications and data includes applications installed on the single electronic device prior to it being delivered to a user;
assigning a second domain to a second stakeholder, wherein the second domain comprises a second grouping of applications and data, wherein the assigning a second domain includes setting aside system resources for the second grouping of applications and data, wherein the second grouping of applications and data includes applications installed on the single electronic device after it is delivered to the user;
defining a first access policy for the first domain, wherein the first access policy defines which stakeholders are permitted to access the applications and data in the first domain, wherein the access policy is based on type enforcement, wherein all processes and objects include attributes of the form user:role:type; and
preventing applications or services in the second domain from accessing data or applications in the first domain according to the first access policy by loading the first access policy into an operating system kernel at runtime.

2. The method of claim 1, wherein the multi-stakeholder environment is a mobile phone environment.

3. The method of claim 1, further comprising:
running a security hook contained in a primitive system call function in a kernel of the multi-stakeholder environment, wherein the security hook checks to see if accessing the first domain is permitted for the second stakeholder.

4. The method of claim 3, wherein the security hook checks to see if accessing the first domain is permitted for the second stakeholder by accessing a security module.

5. The method of claim 4, wherein the security module contains a set of defined policies.

6. The method of claim 1, wherein the preventing applications or services includes:
measuring values of applications or services that interact with the first domain; and
comparing the measured values with pre-defined values to determine if the applications or services are permitted to access particular objects in the first domain.

7. The method of claim 1, wherein the preventing applications or services includes:
measuring a value of an application or service attempting to access an object in the first domain by using an integrity measurement service in a security module, wherein the application or service is operated by the second stakeholder;
passing the measured value to an integrity verification service located in the second domain; and
receiving a determination from the integrity verification service as to whether the application or service can access the object.

8. An apparatus for controlling a multi-stakeholder environment, the apparatus comprising:
memory;
a processor;
an operating system kernel designed to assign a first domain to a first stakeholder wherein the first domain comprises a first grouping of isolated applications and data, wherein the assigning a first domain includes setting aside system resources for the first grouping of isolated applications and data, wherein the first stakeholder is a service provider of a single electronic device, and wherein the first grouping of isolated applications and data includes applications installed on the single electronic device prior to it being delivered to a user;
wherein the operating system kernel is further designed to assign a second domain to a second stakeholder, wherein the second domain comprises a second grouping of applications and data, wherein the assigning a second domain includes setting aside system resources for the second grouping of applications and data, wherein the second grouping of applications and data includes applications installed on the single electronic device after it is delivered to the user;
a security application designed to define a first access policy for the first domain, wherein the first access policy defines which stakeholders are permitted to access the applications and data in the first domain, wherein the access policy is based on type enforcement, wherein all processes and objects include attributes of the form user:role:type; and
wherein the security application is further designed to prevent applications or services in the second domain from accessing data or applications in the first domain according to the first access policy by loading the first access policy into the operating system kernel at runtime.

9. The apparatus of claim 8,
wherein the operating system kernel is further designed to run a security hook contained in a primitive system call function in a kernel of the multi-processor environment, wherein the security hook checks to see if accessing the first domain is permitted for the second stakeholder.

10. The apparatus of claim 7, wherein the security application is further designed to:
measure values of applications or services that interact with the first domain; and
compare the measured values with pre-defined values to determine if the applications or services are permitted to access particular objects in the first domain.

11. The apparatus of claim 8, wherein the security application is further designed to:
measure a value of an application or service attempting to access an object in the first domain by using an integrity measurement service in a security application, wherein the application or service is operated by the second stakeholder;
pass the measured value to an integrity verification service located in the second domain; and
receive a determination from the integrity verification service as to whether the application or service can access the object.

* * * * *